United States Patent
McGriskin et al.

(10) Patent No.: US 10,308,317 B2
(45) Date of Patent: Jun. 4, 2019

(54) REAR DERAILLEUR PROTECTOR

(71) Applicant: Bopworx Limited, Lisnaskea (GB)

(72) Inventors: Paul Gerard McGriskin, Lisnaskea (GB); Ciara Anne McGriskin, Lisnaskea (GB); Cian Desmond O'Sullivan, Limerick (IE)

(73) Assignee: BOPWORX LIMITED, Lisnaskea (GB)

( * ) Notice: Subject to any disclaimer, the term of this patent is extended or adjusted under 35 U.S.C. 154(b) by 0 days.

(21) Appl. No.: 15/106,042

(22) PCT Filed: Dec. 17, 2014

(86) PCT No.: PCT/GB2014/000516
§ 371 (c)(1),
(2) Date: Jun. 17, 2016

(87) PCT Pub. No.: WO2015/092349
PCT Pub. Date: Jun. 25, 2015

(65) Prior Publication Data
US 2017/0001684 A1    Jan. 5, 2017

(30) Foreign Application Priority Data
Dec. 18, 2013   (GB) .................................. 1322373.0

(51) Int. Cl.
*B62J 23/00*      (2006.01)
*B62M 9/128*      (2010.01)

(52) U.S. Cl.
CPC .............. *B62M 9/128* (2013.01); *B62J 23/00* (2013.01)

(58) Field of Classification Search
CPC ................................ B62M 9/128; B62J 23/00
See application file for complete search history.

(56) References Cited

U.S. PATENT DOCUMENTS

| | | | | |
|---|---|---|---|---|
| 2,108,941 A | * | 2/1938 | Morgan | ................. B62M 9/124 474/80 |
| 3,184,993 A | * | 5/1965 | Swenson | ................ B62M 9/128 474/144 |
| 3,931,991 A | | 1/1976 | Marchello | |
| 4,905,541 A | * | 3/1990 | Alan | ........................ B62J 23/00 474/144 |

(Continued)

FOREIGN PATENT DOCUMENTS

CN        201501489 U    6/2010
CN        201737092 U    2/2011
(Continued)

OTHER PUBLICATIONS

International Preliminary Report with respect to related PCT Application No. PCT/GB2014/000516 dated Jun. 21, 2016.
(Continued)

*Primary Examiner* — Vicky A Johnson
(74) *Attorney, Agent, or Firm* — RatnerPrestia

(57) ABSTRACT

A rear derailleur protector for a bicycle comprising a shield to protect the derailleur and mounting means on the shield for mounting the shield on the bicycle, the mounting means being adapted to engage the bicycle and a stand attachable to the derailleur protector to support a bicycle fitted with the derailleur protector in an upright position.

14 Claims, 14 Drawing Sheets

(56) References Cited

U.S. PATENT DOCUMENTS

| | | | | |
|---|---|---|---|---|
| 5,480,366 A | * | 1/1996 | Harnden | A63B 69/16 |
| | | | | 482/57 |
| 5,540,118 A | * | 7/1996 | Calendrille, Jr. | B62J 23/00 |
| | | | | 474/144 |
| 7,066,857 B1 | * | 6/2006 | DeRosa | B62J 23/00 |
| | | | | 474/144 |
| 8,882,130 B2 | | 11/2014 | Hara et al. | |
| 2017/0001673 A1 | * | 1/2017 | McGriskin | B25H 1/0014 |

FOREIGN PATENT DOCUMENTS

| | | | | | |
|---|---|---|---|---|---|
| DE | 202004012305 | U1 | | 11/2004 | |
| EP | 0012454 | A2 | * | 6/1980 | B62M 9/1248 |
| EP | 0012454 | B1 | | 7/1983 | |
| EP | 0315039 | A | * | 5/1989 | B62J 13/00 |
| EP | 0315039 | A2 | | 5/1989 | |
| EP | 0343751 | A1 | | 11/1989 | |
| EP | 1547911 | A2 | | 6/2005 | |
| EP | 2363339 | A1 | * | 9/2011 | B62K 25/02 |
| EP | 2578480 | A1 | | 4/2013 | |
| FR | 997452 | | | 1/1952 | |
| FR | 1058305 | | | 3/1954 | |
| FR | 1104113 | A | | 11/1955 | |
| FR | 2236714 | | | 2/1975 | |
| GB | 810243 | | | 3/1959 | |
| JP | S559780 | | | 1/1980 | |
| KR | 20090010258 | | | 1/2009 | |
| KR | 20090010258 | A | * | 1/2009 | |
| NL | 1000573 | | | 12/1996 | |
| WO | 1992017365 | A1 | | 10/1992 | |

OTHER PUBLICATIONS

International Search Report and Written Opinion with respect to related PCT Application PCT/GB2014/000516 dated Apr. 13, 2015.

* cited by examiner

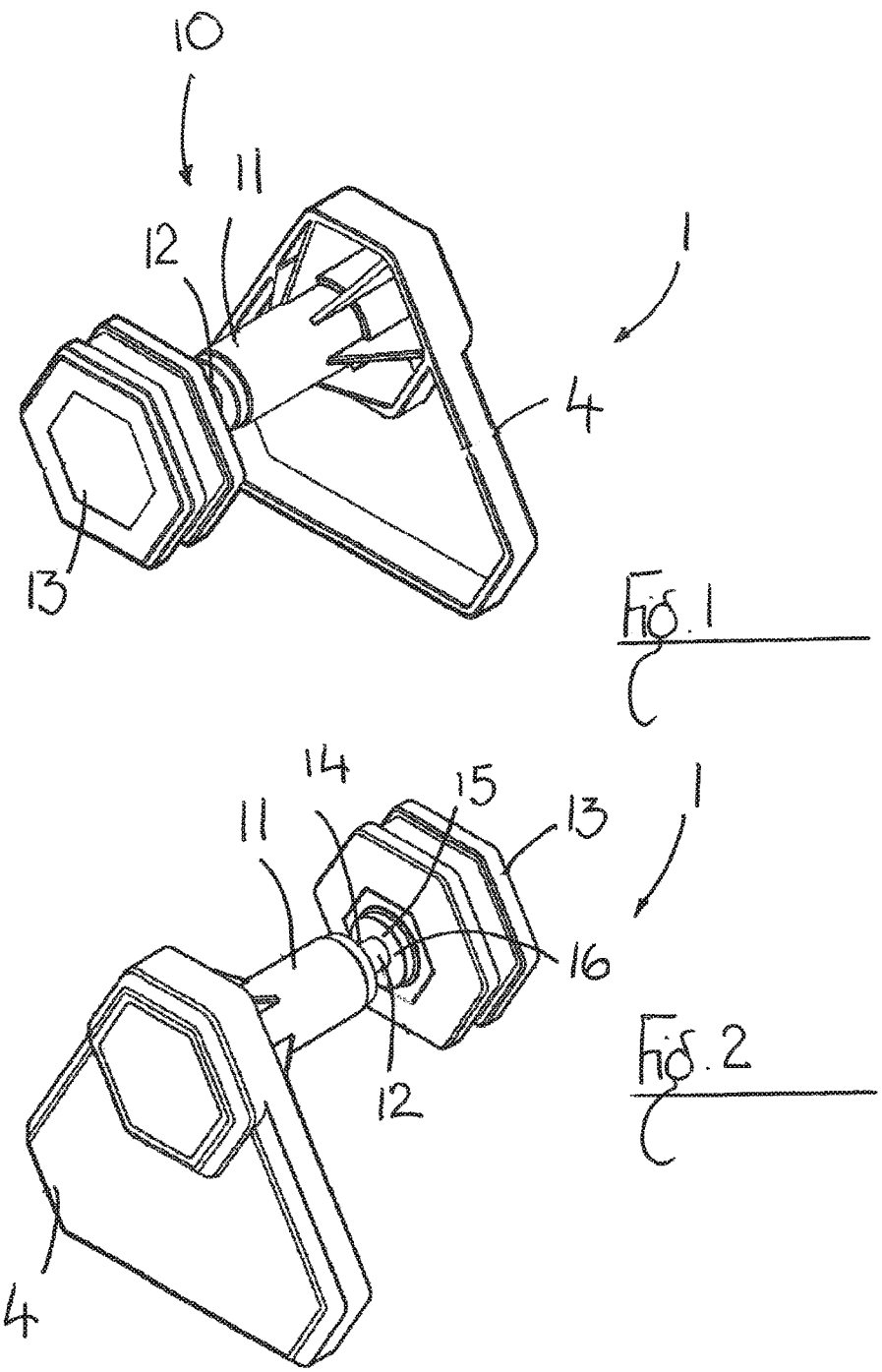

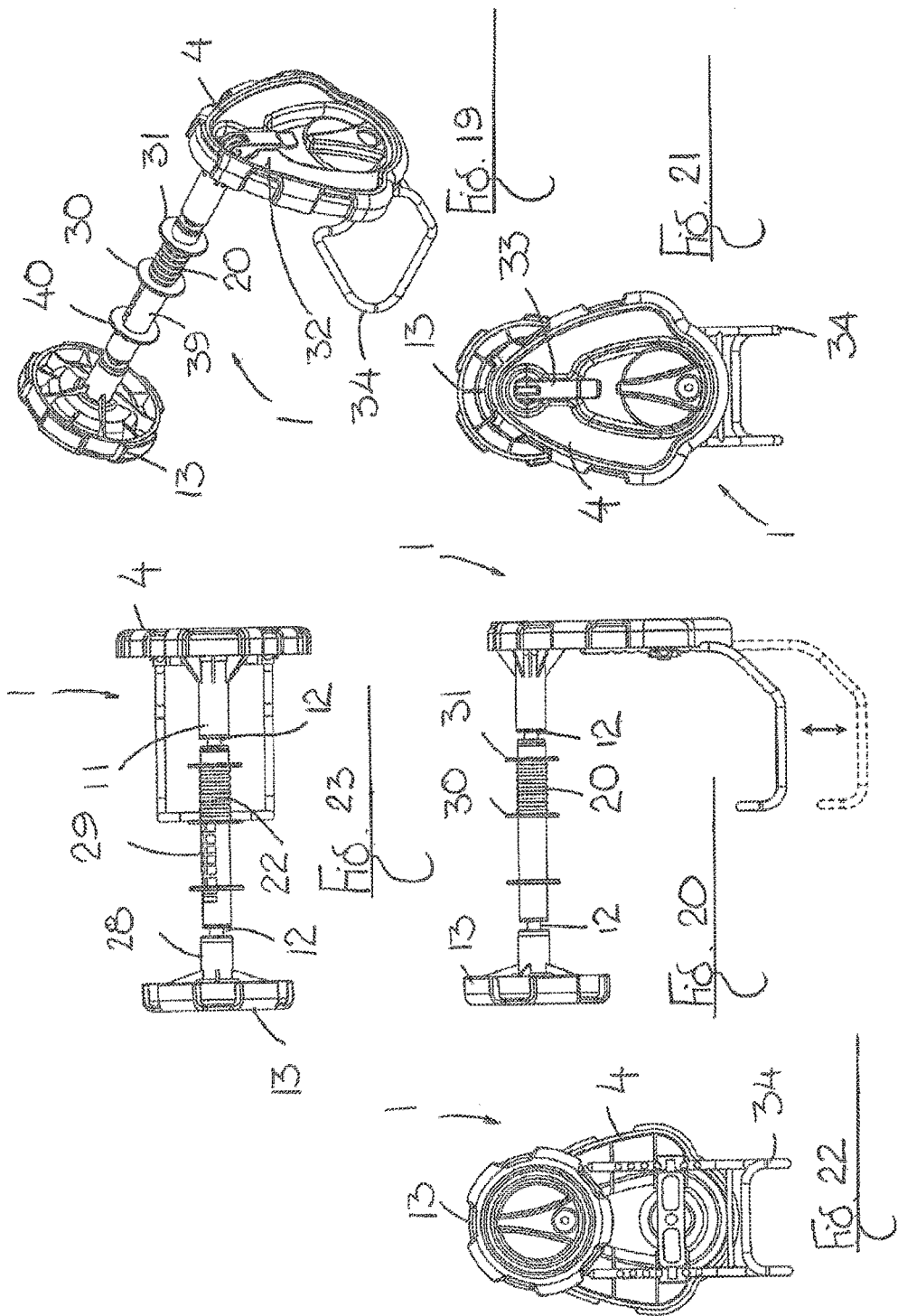

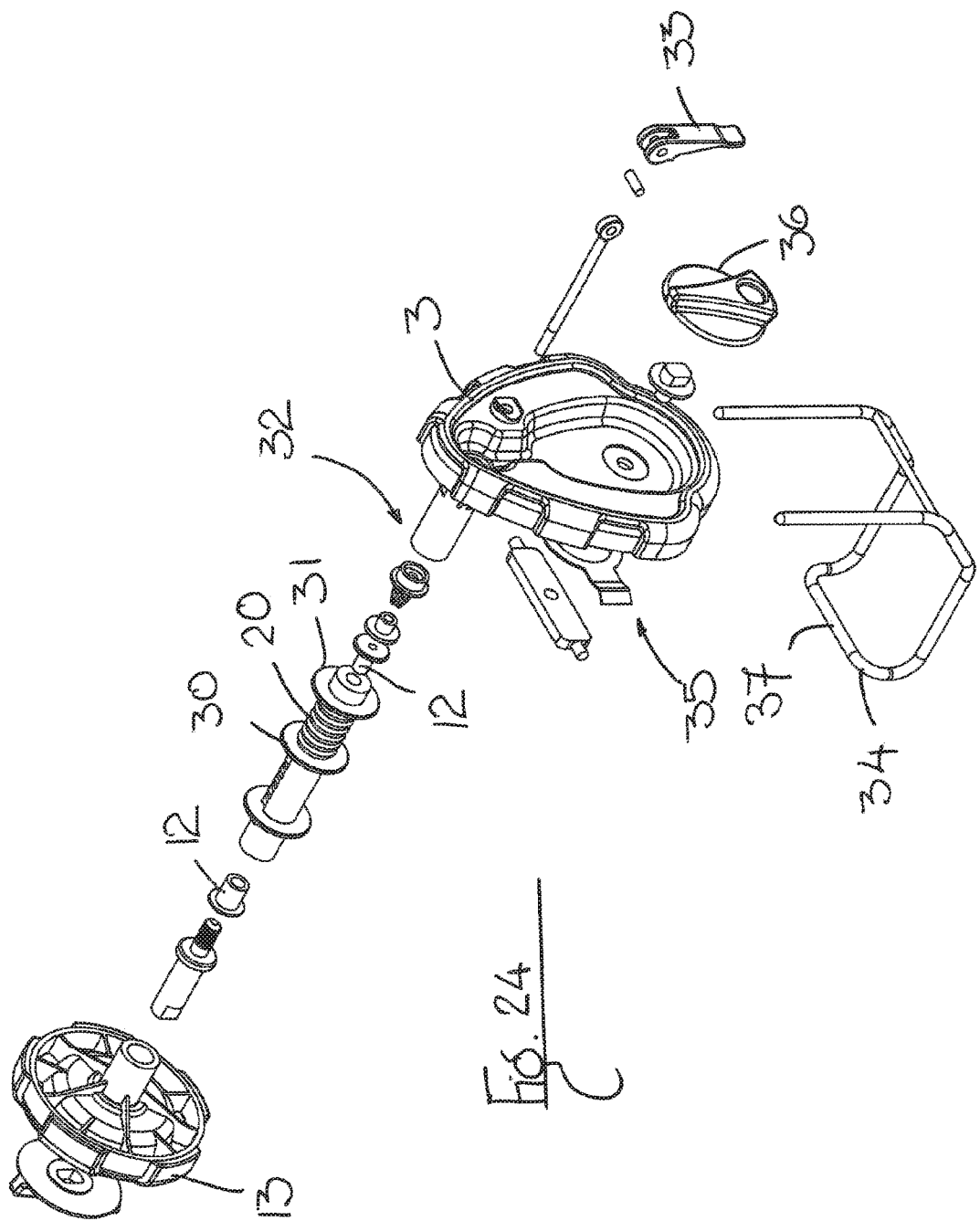

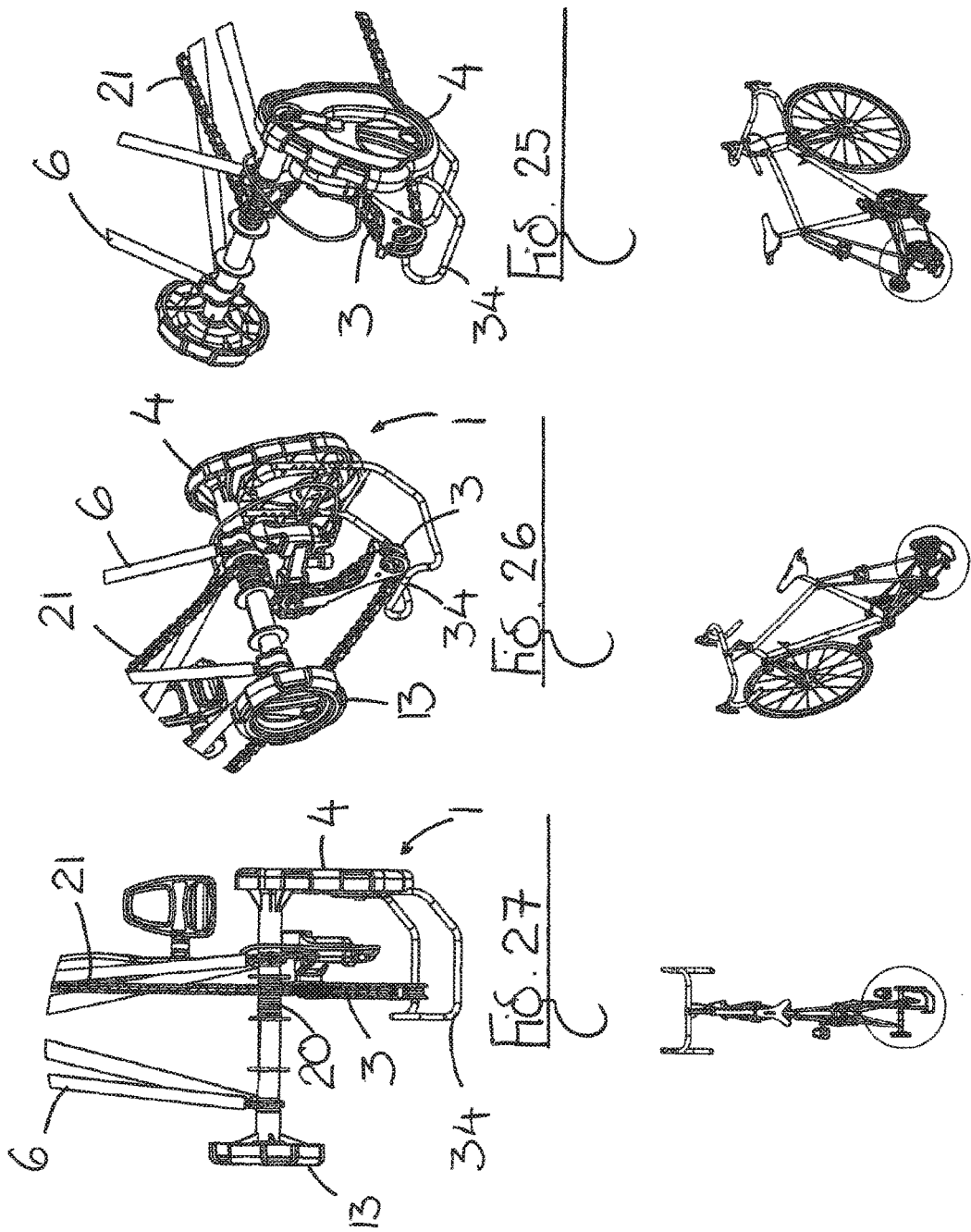

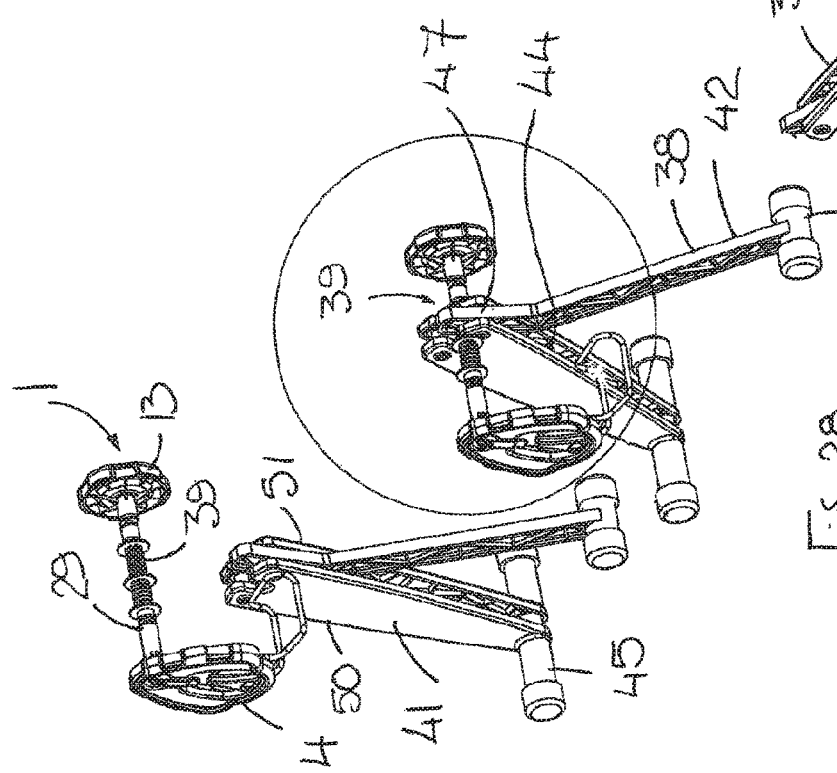
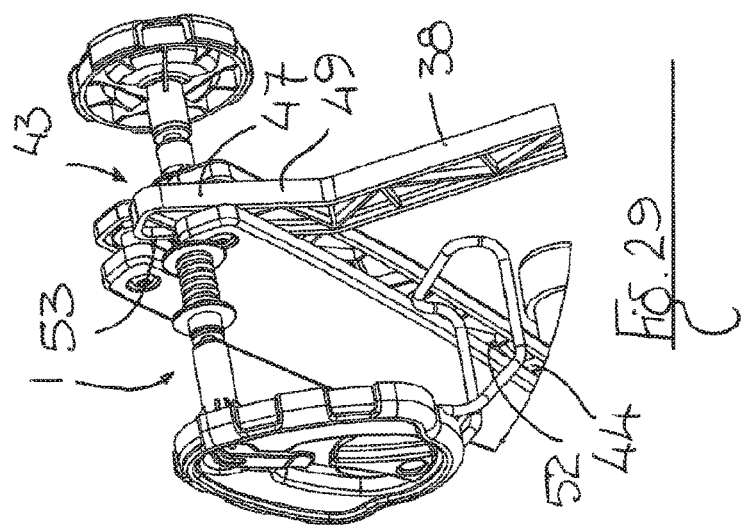
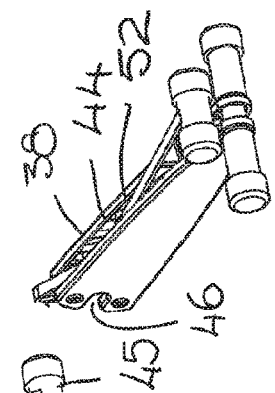
Fig. 28
Fig. 29

REAR DERAILLEUR PROTECTOR

CROSS REFERENCE TO RELATED APPLICATIONS

This application is a 35 USC 371 application of International PCT Patent Application No. PCT/GB2014/000516, filed on Dec. 17, 2014, which claims priority to Great Britain Patent Application GB1322373.0, filed Dec. 18, 2013; all of the contents of which are hereby incorporated by reference in their entireties.

Field of the Invention

This invention relates to a rear derailleur protector for a bicycle and to a kit comprising the rear derailleur protector and a stand.

BACKGROUND OF THE INVENTION

Bicycles are susceptible to damage during normal use and also during storage or transportation of the bicycle. In particular, the rear derailleur of a bicycle may be damaged as a result of impact against other objects, or due to exposure to dirt of chemical substances, including water. The rear derailleur of a bicycle can be relatively expensive to repair or replace, and such work may need to be carried out by a skilled professional.

It would therefore be desirable to provide a device that mitigates the issues outlined above and which can advantageously prevent damage to the rear derailleur of a bicycle.

SUMMARY OF THE INVENTION

According to the invention there is provided a rear derailleur protector for a bicycle comprising:
  a shield to protect a derailleur, and
  mounting means on the shield for mounting the shield on a bicycle, the mounting means being adapted to engage the bicycle.

Preferably, the mounting means is adapted to reversibly engage the bicycle. More preferably, the mounting means is adapted to slidably engage the bicycle. Most preferably, the mounting means is adapted to slidably engage a bicycle rear wheel axle.

Suitably, the mounting means comprises a coupling for engaging the rear wheel axle. Preferably, the coupling comprises a bifurcated coupling.

Alternatively, the mounting means is adapted to slidably engage a bicycle rear fork.

Preferably, the mounting means is adapted to slidably engage at least one bicycle rear fork dropout. More preferably, the mounting means comprises at least one tie-bar is slidably insertable in the at least one rear fork dropout. Most preferably, the mounting means comprises two tie-bars slidably insertable in the two bicycle rear fork dropouts.

Advantageously, the at least one tie bar is contiguous with a stem oriented transversely to the shield.

Suitably, the at least one tie bar is located at an end of an axial rod contiguous with the stem.

In a preferred embodiment, the rear derailleur protector comprises a drivechain holder adjacent the shield.

Preferably, the shield is detachable from the rear derailleur protector.

More preferably, the shield comprises a plate.

Optionally, the plate comprises an auxiliary protective shield to further protect the derailleur. Preferably, the auxiliary protective shield comprises a second plate located adjacent the plate operable between a retracted state and an extended state. More preferably, the auxiliary protective shield comprises a guard cage dependent from the plate.

Suitably, the rear derailleur protector further comprises a handle such that the mounting means is disposed between the handle and the shield.

Preferably, the mounting means is adjustable via the handle. More preferably, the mounting means is adjustable via the shield.

Suitably, the mounting means is adjustable via a quick release mechanism on the rear derailleur protector.

In a preferred embodiment of the invention, the derailleur protector is adapted for use with a stand to hold bicycles from which the rear wheel has been removed in the upright position.

Preferably, the stand comprises an A-shaped stand. More preferably, the A-shaped stand comprises a major leg and a minor leg connected to the major leg at a hinge, the stand being moveable between a folded position and an upright position about the hinge.

Advantageously, the major leg comprises a housing to receive the minor leg in the folded position.

Preferably, the minor leg comprises a dog-leg shape.

The invention also extends to a rear derailleur protector kit comprising a rear derailleur protector substantially as hereinbefore defined and a stand to hold the rear derailleur protector.

Preferably, the stand comprises a rear derailleur protector mounting for holding the rear derailleur protector. More preferably, the rear derailleur protector mounting comprises a clamp-like mounting.

Suitably, the stand comprises an A-shaped stand. Preferably, the A-shaped stand comprises a major leg and a minor leg connected to the major leg at a hinge, the stand being moveable between a folded position and an upright position about the hinge.

Advantageously, the hinge comprises a dual function hinge cum clamp to clamp the rear derailleur protector in situ in the upright position.

Preferably, the major leg comprises a housing to receive the minor leg in the folded position. More preferably, the minor leg comprises a dog-leg shape.

Accordingly, in one aspect, the invention provides a device for protecting a rear derailleur of a bicycle, wherein the device comprises at least one plate, which is reversibly mountable to the bicycle and arranged to at least partially occlude the rear derailleur of the bicycle.

Optionally, the plate is reversibly mountable to the frame of the bicycle. Optionally, the plate is reversibly mountable to the rear fork of the bicycle. Optionally, the plate is reversibly mountable to the dropout of the rear fork of the bicycle. Optionally, the plate is reversibly mountable to the axle of the rear wheel of the bicycle.

Optionally, the device comprises at least one plate and mounting means. Further optionally, the device comprises at least one plate and mounting means for reversibly mounting the device to the frame of the bicycle, optionally to the rear fork of the bicycle, further optionally to the dropout of the rear fork of the bicycle, still further optionally to the axle of the rear wheel of the bicycle.

Optionally, the mounting means are arranged to engage, optionally reversibly engage, any one of the frame of the bicycle, the rear fork of the bicycle, the dropout of the rear fork of the bicycle, and the axle of the rear wheel of the bicycle.

Optionally, the mounting means are reversibly connected to the plate. Alternatively, the mounting means are fixedly connected to the plate.

Optionally, the mounting means comprise a tie bar for mounting the plate to the bicycle. Optionally, the tie bar is arranged, optionally shaped and dimensioned, to engage, optionally reversibly engage, any one of the frame of the bicycle, the rear fork of the bicycle, and the dropout of the rear fork of the bicycle. Further optionally, the tie bar is arranged, optionally shaped and dimensioned, to engage, optionally reversibly engage, the dropout of the rear fork of the bicycle.

Optionally, the mounting means comprise a tie bar engageable with the plate. Optionally, the mounting means further comprises a handle. Optionally, the mounting means comprises a tie bar engageable with the plate and a handle. Optionally, the tie bar comprises first and second opposing ends wherein the first end is engageable with the plate and the second end is engageable with the handle.

Optionally, the plate is substantially planar.

Optionally, the plate is arranged, optionally shaped and dimensioned to at least partially occlude the rear derailleur of the bicycle.

Optionally, the plate further comprises a lip, which is arranged, optionally shaped and dimensioned, to at least partially occlude the rear derailleur of the bicycle.

Optionally, the plate, optionally, the plate and the lip, are each or together arranged, optionally shaped and dimensioned, to at least partially occlude the rear derailleur of the bicycle. Further optionally, the plate, optionally, the plate and the lip, are each or together arranged, optionally shaped and dimensioned, to at least partially retain the rear derailleur of the bicycle.

Optionally, in use, the plate, optionally, the plate and the lip, are each or together arranged, optionally shaped and dimensioned, to space the rear derailleur of the bicycle from a surface in which the rear derailleur is in contact.

Optionally, the plate comprises a stem. Optionally, the plate comprises a stem engageable with the tie bar. Optionally, the plate comprises a stem adapted to receive the tie bar. Optionally, the plate comprises a stem mountable to the tie bar. Optionally, the stem projects substantially perpendicularly from the plate.

Optionally the stem is substantially hollow. Optionally, the stem comprises an open mouth to receive the tie bar. Optionally, the tie bar is engageable within an open mouth of the stem. Optionally at least part of the internal surface of the hollow stem comprises a threaded liner. Further optionally the stem, optionally the threaded liner, is formed from a metal. Still further optionally the metal is an alloy, and optionally the alloy is steel. Optionally, the metal is magnetic.

Optionally, the handle is engageable with the tie bar. Optionally, the handle is adapted to receive the tie bar. Optionally, the handle is mountable to the tie bar. Optionally, the handle comprises a cavity having an open mouth to receive the tie bar. Optionally, the tie bar is engageable within an open mouth of the cavity. Optionally at least part of the internal surface of the cavity comprises a threaded liner. Further optionally the handle, optionally the threaded liner, is formed from a metal. Still further optionally the metal is an alloy, and optionally the alloy is steel.

Optionally at least part of the outer surface of the tie bar is threaded. Optionally the threaded surface of the tie bar is engageable with the threaded liner of the stem of the plate. Optionally, or additionally, the threaded surface of the tie bar is engageable with the threaded liner of the cavity of the handle.

Optionally, the tie bar is integrally formed with the plate. Optionally, or additionally, the tie bar is integrally formed with the handle.

Optionally the device further comprises a washer, wherein, in use, the washer is disposed around the tie bar. Optionally, in use, the washer is disposed around the tie bar and abuts the open mouth of the stem of the plate.

Optionally, the device comprises a housing for a drivechain of a bicycle. Optionally, the handle comprises a housing for a drivechain of a bicycle. Further optionally, the tie bar comprises a housing for a drivechain of a bicycle. Optionally, the housing is a channel. Optionally, the housing is a channel on the handle. Optionally, the housing is a channel formed on at least part of the surface of the handle. Optionally, the housing is a channel on the tie bar. Optionally, the housing is a channel formed on at least part of the surface of the tie bar.

Optionally, the mounting means comprise a coupling, optionally a bifurcated coupling, which is operable to mount the plate to the bicycle. Optionally, the bifurcated coupling is engageable about the axle of a bicycle wheel.

Optionally, the coupling is substantially L-shaped. Optionally, the coupling comprises first and second arms forming the L-shape. Further optionally, the coupling comprises first and second arms, wherein the first arm is connected to the plate and the second arm includes a bifurcated opening engageable with the axle of the bicycle wheel.

Optionally, the coupling is reversibly connected to the plate. Alternatively, the coupling is integrally formed with the plate.

Optionally, the plate is an extendable plate. Further optionally, the plate is operable between a retracted state and an extended state.

Optionally, the extendable plate comprises first and second plates. Optionally, the second plate is located adjacent to the first plate of the device. Optionally, the second plate is in a side by side relationship with the first plate.

Optionally, the first and second plates are arranged for relative movement. Further optionally, the first and second plates are arranged for relative reciprocal movement. Still further optionally, the first and second plates are arranged for relative slidable reciprocal movement.

Optionally, the second plate is movable relative to the first plate between a retracted state and an extended state. Optionally, the second plate is movable coplanar relative to the first plate between a retracted state and an extended state. Optionally, the second plate is releasably connected to the first plate. Optionally, the second plate is releasably connected to the first plate using a connecting means. Optionally, the connecting means provides an audible feedback when the second plate is moved from the retracted state to the extended state, or from the extended state to the retracted state. Optionally, or additionally, the connecting means provides a tactile feedback when the second plate is moved from the retracted state to the extended state, or from the extended state to the retracted state.

Optionally, the first and second plates are formed of a plastic, optionally hard plastic, material. Optionally, the handle is formed of the same or different plastic, optionally hard plastic, material. Optionally the tie bar, the stem, the threaded liner and the coupling are formed of a metal. Optionally the tie bar, the stem, the threaded liner and the coupling are formed of the same or different metal. Further optionally the metal is an alloy, and optionally the alloy is steel. Optionally, the metal is magnetic.

The rear derailleur protector of the invention is reversibly attachable to and removable from bicycles without requiring the use of tools i.e. the rear derailleur protector provides temporary yet effective protection for derailleurs without interfering with the bicycle frame or other components. The rear derailleur protector of the invention can be manually slid on to the bicycle in a simple fashion and easily removed in a similar fashion.

The rear derailleur protector of the invention can also be used with the rear wheel bicycle in place or removed as required and the shielding plate of the rear derailleur protector is also adjustable through the use of integral sliding plates or a cage guard to protect the rear derailleur regardless of the position of the cogs of the derailleur.

The rear derailleur protector also serves to protect the rear derailleur from the sides and below.

The rear derailleur protector of the invention can also be used to protect the rear fork dropouts of bicycles from damage where the rear wheel is removed from the bicycle. Moreover, the rear derailleur protector also serves to maintain the rear fork dropouts in the correct spatial arrangement and support the rear fork dropouts in the absence of the rear wheel.

The rear derailleur protector is also adapted for use with a stand to hold bicycles from which the rear wheel has been removed in the upright position whilst simultaneously protecting the rear derailleur and the rear fork dropouts from contamination and damage.

BRIEF DESCRIPTION OF THE DRAWINGS

Embodiments of the present invention will now be described by way of example only with reference to the accompanying drawings in which:

FIG. 1 is a perspective view from above and one side of a first embodiment of a rear derailleur protector of the invention in which the rear derailleur protector is engageable with the rear dropout of a bicycle;

FIG. 2 is a perspective view from above and the opposite side of the rear derailleur protector of FIG. 1;

FIG. 19 is a perspective view from above and one side of a fifth embodiment of the rear derailleur protector of the invention in which the rear derailleur protector is adapted to engage both dropouts of the rear fork and is fitted with an auxiliary protective shield in the form of a dependant slidable cage guard to protect the derailleur from below, the rear derailleur protector also being adapted for use with a stand;

FIG. 20 is a rear plan view of the rear derailleur protector of FIG. 19;

FIG. 21 is a side elevation of the rear derailleur protector;

FIG. 22 is a side elevation from the opposite side of the rear derailleur protector;

FIG. 23 is a plan view from above of the rear derailleur protector;

FIG. 24 is an exploded perspective view from above and one side of the rear derailleur protector;

FIG. 25 is an enlarged perspective view from above and one side of the rear derailleur protector fitted to the rear dropout of a bicycle;

FIG. 26 is an enlarged perspective view from above and the opposite side of the rear derailleur protector fitted to the rear dropout of the bicycle;

FIG. 27 is a rear plan view of the rear derailleur protector fitted to the rear dropout of the bicycle;

FIG. 28 is a perspective view from above and one side of the rear derailleur protector of FIGS. 19 to 27 mounted in a foldable stand in the operating position for supporting the bicycle adapted for use with the rear derailleur protector together with a perspective view from above and one side of the stand in the folded position;

FIG. 29 is an enlarged perspective view from above and one side of the rear derailleur protector mounted in the stand;

DETAILED DESCRIPTION OF THE INVENTION

Figure 3:
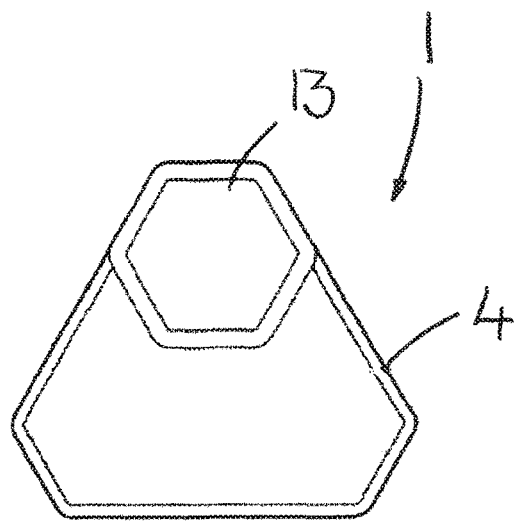
FIG. 3 is a side elevation of the rear derailleur protector.
Figure 4:
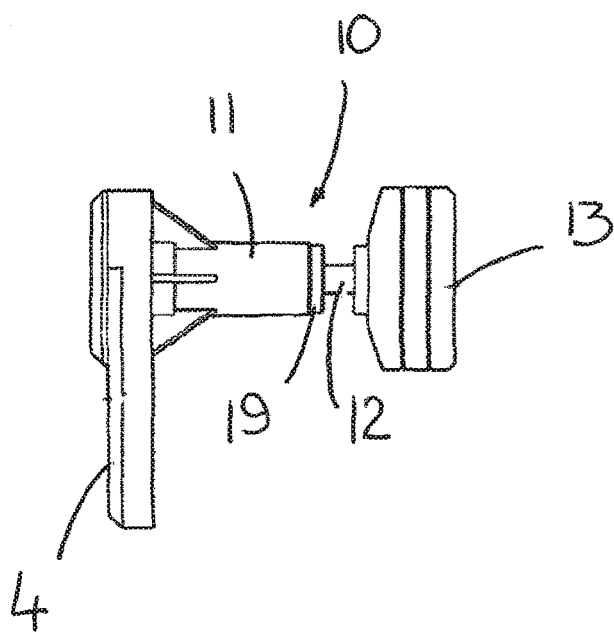
FIG. 4 is a front view of the device of the rear derailleur protector.
Figure 5:
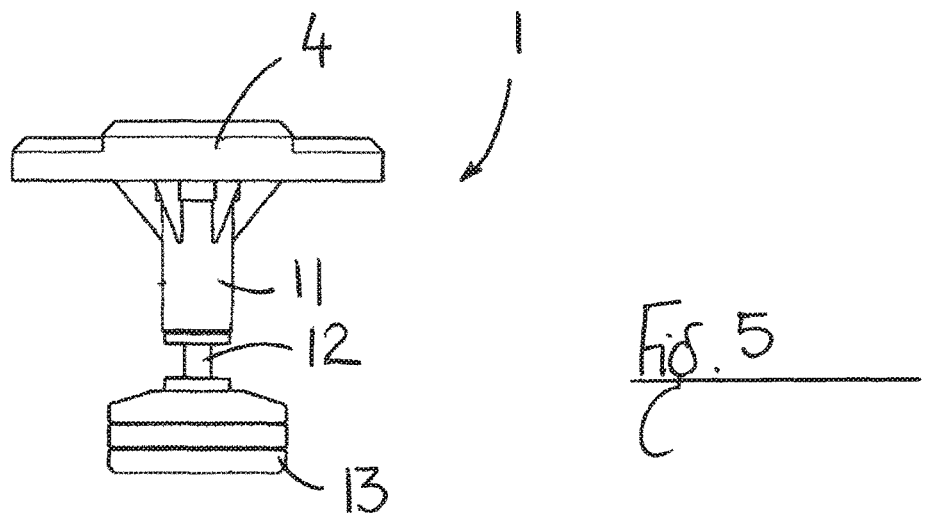
FIG. 5 is a plan view from above of the rear derailleur protector.
Figure 6:
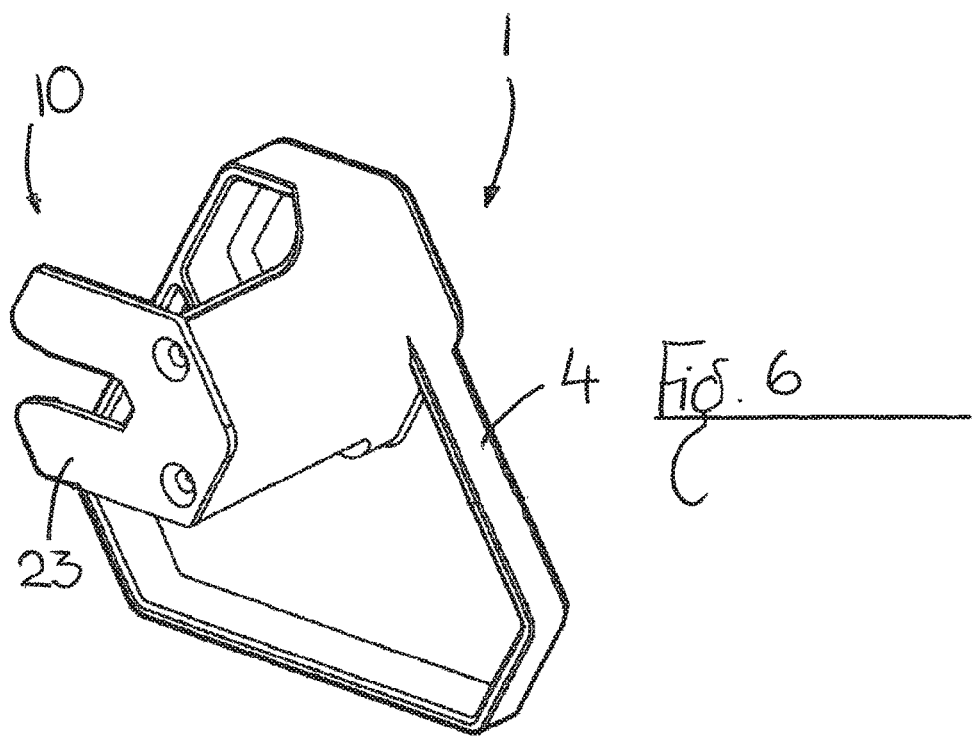
FIG. 6 is a perspective view from above and one side of a second embodiment of the rear derailleur protector of the invention in which the rear derailleur protector is enagageable with the axle of a bicycle rear wheel.
Figure 7:
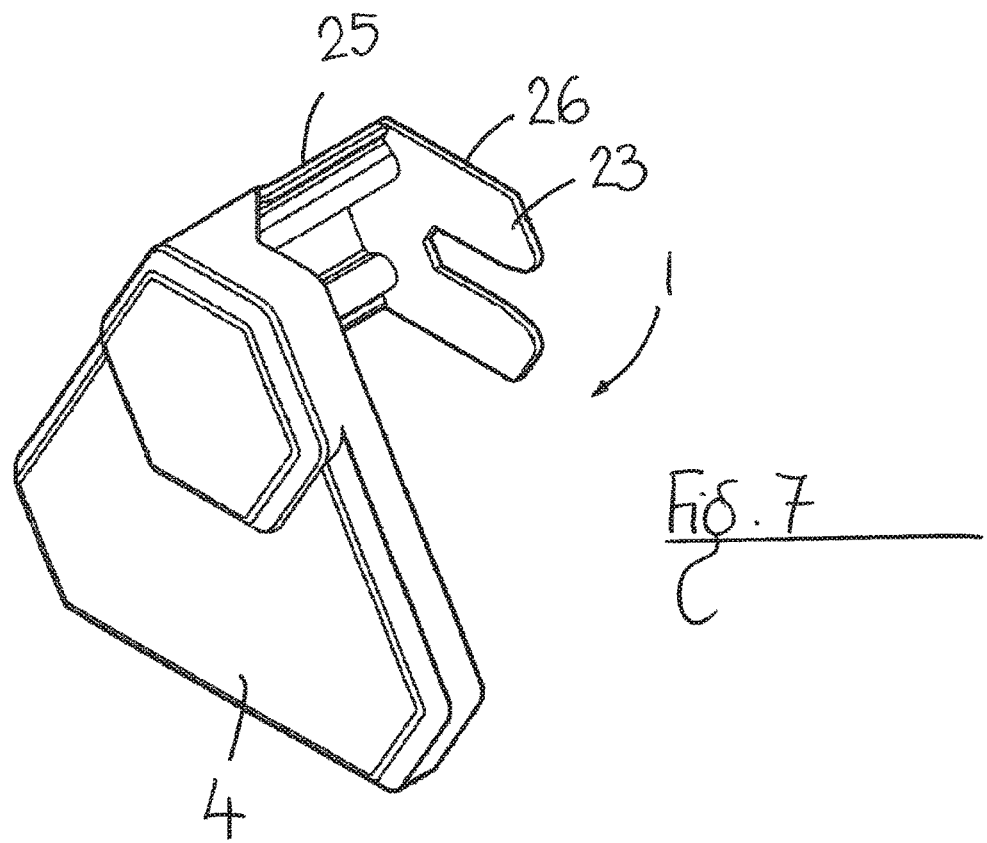
FIG. 7 is a perspective view from above and the opposite side of the rear derailleur protector of FIG. 6.
Figure 8:
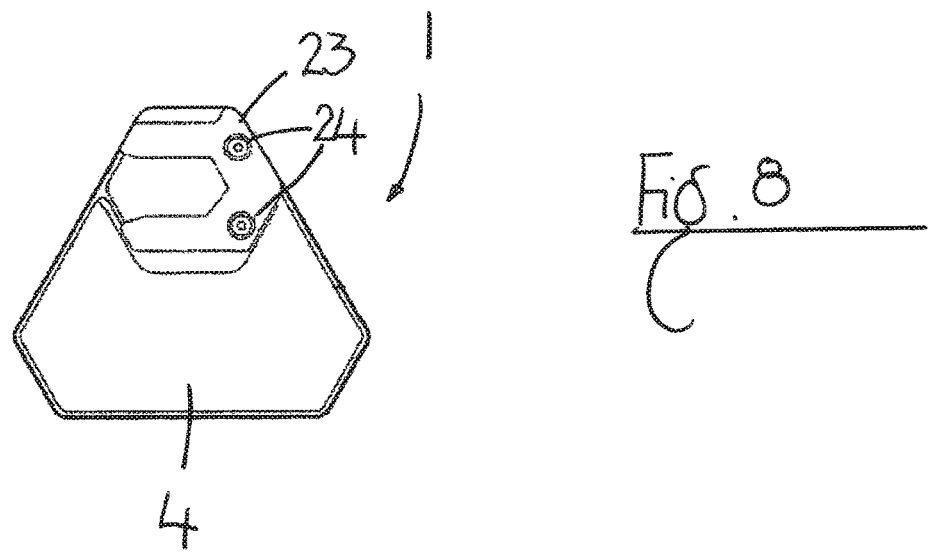
FIG. 8 is a side elevation of the rear derailleur protector.
Figure 9:
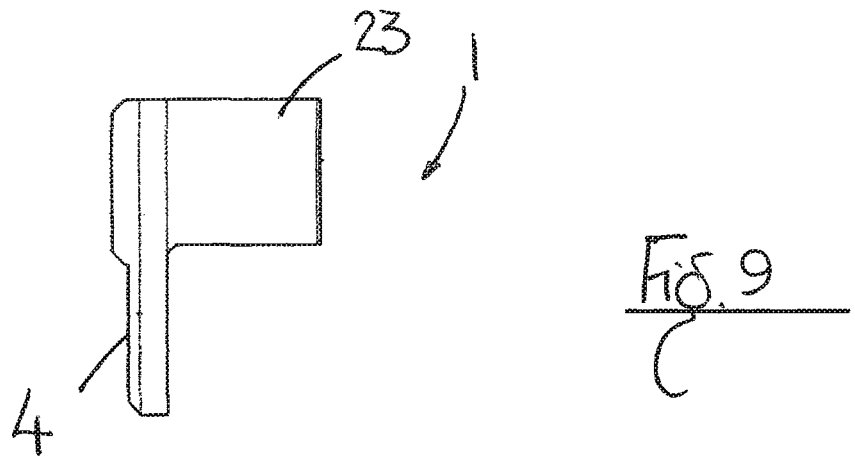
FIG. 9 is a front view of the rear derailleur protector.
Figure 10:
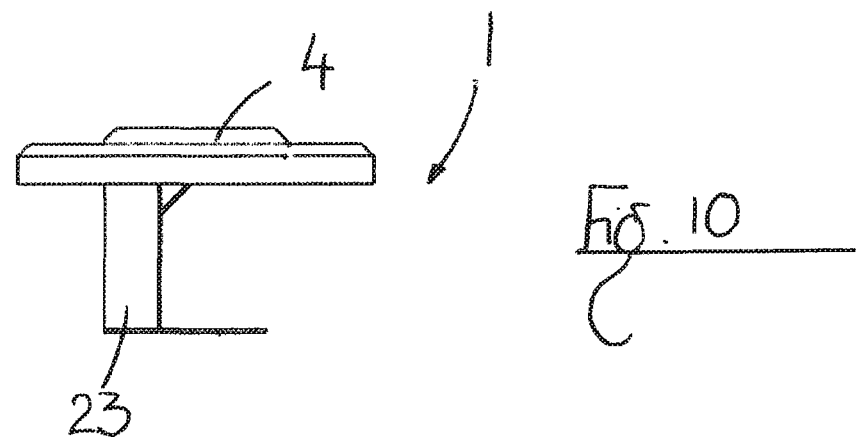
FIG. 10 is a plan view from above of the rear derailleur protector.
Figure 11:
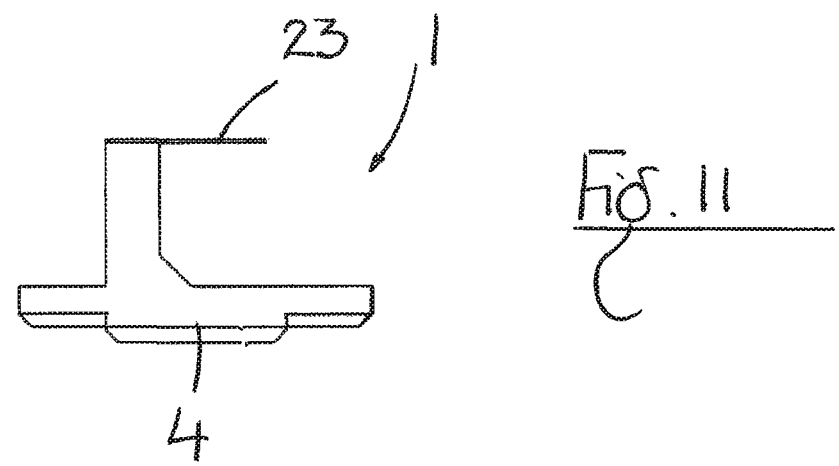
FIG. 11 is a plan view from below of the rear derailleur protector.

The present invention provides a rear derailleur protector 1 which may be mounted to a bicycle 2 to protect the rear derailleur 3 of the bicycle 2. The rear derailleur protector 1 comprises at least one protective shield in the form of a plate 4 that is reversibly mountable to the bicycle 2. The plate 4 is arranged to at least partially occlude the rear derailleur 3 of the bicycle 2 and so protect the rear derailleur 3. The rear derailleur protector 1 may be mounted to any part of the bicycle 2 from where the plate 4 can provide protection to the rear derailleur 3. For example, the rear derailleur protector 1 may be mounted to the frame 5 of the bicycle 2, the rear fork 6 (i.e. the seatstays) of the bicycle 2, the dropout 7 of the rear fork 6, and/or to the axle 8 of the rear wheel 9 of the bicycle 2.

The rear derailleur protector 1 of the invention may be mounted to the bicycle 2 when the rear wheel 9 of the bicycle 2 is attached to the bicycle 2, or when the rear wheel 9 has been removed. The rear derailleur protector 1 may be mounted to the bicycle 2 by any suitable means, such as a mounting means 10.

Referring to FIGS. 1 to 5, there is shown an embodiment of the rear derailleur protector 1 for protecting a rear derailleur 3 of a bicycle 2, the rear derailleur protector 1 comprising a protective plate 4 having a stem 11 oriented transversely to the plane of the plate, a tie bar 12, and a handle 13, wherein the stem 11 and handle 13 engage opposite first and second ends 14,15 respectively of the tie bar 12. Thus, the plate 4 may reversibly engage a first end 14 of the tie bar 12 via the stem 11 and the handle 13 may reversibly engage the second end 15 of the tie bar 12. In some embodiments, the tie bar 12 may be integrally formed with one or both of the plate 4 and the handle 13.

The plate 4 may engage the tie bar 12 by any suitable means. The plate 4 may comprise a stem 11 which may be suitably shaped and dimensioned to receive and engage the tie bar 12. The plate 4 may be substantially planar in form and the stem 11 may project substantially perpendicularly from the plate 4 relative to the plane of said plate 4. Further, in use, the tie bar 12 may project substantially perpendicularly from the plate 4 relative to the plane of said plate 4. The stem 11 may comprise a hollow core to receive the tie bar 12. In certain embodiments, the internal surface, that is the interior walls, of the stem 11 may comprise a threaded liner. The threaded liner may correspond to threads on at least part of the surface of the tie bar 12 and thus the tie bar 12 may engage the stem 11 by screwing the tie bar 12 into the hollow core of the stem 11. In other embodiments, the tie bar 12 and the stem 11 may form an interference coupling.

The handle 13 may also engage the tie bar 12 by any suitable means. The handle 13 may comprise a cavity 16 which may be suitably shaped and dimensioned to receive and engage the tie bar 12. In certain embodiments, the internal surface, that is the interior walls, of the cavity 16 comprise a threaded liner. The threaded liner may correspond to threads on at least part of the surface of the tie bar 12 and thus the tie bar 12 may engage the handle 13 by screwing the tie bar 12 into the cavity 16 of the handle 13. In some embodiments, the tie bar 12 and the cavity 16 of the handle 13 may form an interference coupling.

In use, the tie bar 12 may be engaged with the plate 4 and may then be screwed into the handle 13 by rotating the handle 13. Alternatively, the tie bar 12 may be engaged with the handle 13 and may then be screwed into the plate 4 by rotating the handle 13. Furthermore, in use, the rear derailleur protector 1 may be clamped to a bicycle 2 by placing the plate 4 and the handle 13 at opposing sides of a drop out slot 17 located at the free end of a fork blade 18 of a bicycle 2 and sliding/placing the tie bar 12 into the drop out slot 17.

The handle 13 may be manipulated to insert the tie bar 12 into the stem 11 of the plate 4 and may further be rotated to screw the tie bar 12 into the stem 11. The screwing of the tie bar 12 into the stem 11 of the plate 4 results in closing the gap between the plate 4 and handle 13 until the rear derailleur protector 1 is securely clamped, that is mounted, to the bicycle 2.

In further embodiments, the tie bar 12 may be integrally formed with the plate 4. Alternatively or additionally, the tie bar 12 may be integrally formed with the handle 13. In use, the tie bar 12 may secure the plate 4 to the bicycle 2, for example, to the dropout 7 of the fork 6 of the bicycle 2, by slidably inserting the tie bar 12 into the dropout 7 and forming a tight fit within the dropout 7. Thus, in some embodiments, the tie bar 12, and plate 4 and/or handle 13, may be held on the bicycle by a push-fit friction adhesion.

The rear derailleur protector 1 may further comprise a washer 19, wherein, in use, the washer may be disposed around the tie bar 12, and may abut the open mouth of the stem 11 of the plate 4.

The rear derailleur protector 1 may further comprise a holder or housing 20 for retaining the drivechain 21 of a bicycle 2 about the rear derailleur protector 1. The housing 20 advantageously allows the drivechain 21 to be held in a position on the rear derailleur protector 1 and helps prevent the soiling of the rear derailleur protector 1, or the user of the rear derailleur protector 1 or bicycle 2, with oil from the drivechain 21. In embodiments of the invention, the housing 20 may be located on the handle 13. Alternatively, the housing 20 may be located on the tie bar 12. The housing 20 may comprise a channel 22 suitably shaped and dimensioned to receive and releasably retain the drivechain 21. Thus, the channel 22 may be located on the handle 13 or the tie bar 12. The channel 22 may be formed on at least part of the surface of the handle 13 or the tie bar 12. The handle 13 and/or the tie bar 12 may have a substantially circular configuration, as depicted in FIG. 12, and the channel 22 may be formed around part or all of the circumference of the handle 13 or the tie bar 12.

The mounting means 10 may comprise a bifurcated coupling 23 that is operable to secure the plate 4 to the bicycle 2. The bifurcated coupling 23 may be used to secure the plate 4 to the bicycle 2 and may be slidably engageable about the axle 8 of a bicycle wheel 9. The bifurcated coupling 23 may be connected to the plate 4 by any suitable means. The bifurcated coupling 23 may be reversibly connected to the plate 4. For example, the bifurcated coupling 23 may comprise a screw portion 24 for screwing the coupling 23 to the plate 4. Alternatively, the bifurcated coupling 23 may be integrally formed with the plate 4. In some embodiments, the bifurcated coupling 23 may be substantially L-shaped i.e. the bifurcated coupling 23 may be formed of two generally linear or planar (first and second) arms 25, 26 which are disposed relatively perpendicularly to each other. The first arm 25 of the bifurcated coupling 23 may be connected to the plate 4 and the second arm 26 may comprise the bifurcated portion 23. Such an embodiment is depicted in FIGS. 7 to 11.

In use, to fix the plate 4 and bifurcated coupling 23 to a bicycle 2, the bolt or quick release mechanism of the rear wheel 9 may be unscrewed to create a 2-5 mm gap between the frame 5 of the bicycle 2 (that is, the rear fork 6) and the axle 8 of the wheel adjacent the rear derailleur 3. In some cases, to create the required gap the user can additionally pull the rear fork 6 apart from the axle 8 of the wheel 9 to create the 2-5 mm gap required to introduce the bifurcated coupling 23. Once the bifurcated coupling 23 is in position about the axle 8 of the wheel 9 and the plate 4 correctly positioned to protect the rear derailleur 3 (i.e. vertically aligned with the derailleur arms), the bolt or quick release mechanism is re-tightened thus securing the rear derailleur protector 1 to the bicycle 2.

Figure 12:
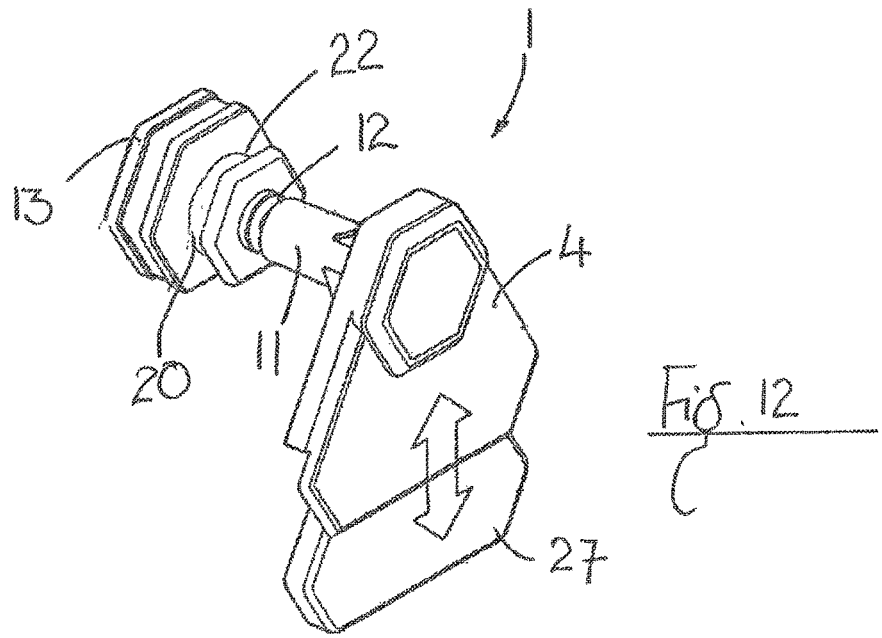
FIG. 12 is a perspective view from above and one side of a third embodiment of a rear derailleur protector of the invention similar to the rear derailleur protector of FIG. 1 in which the rear derailleur protector is provided with an auxiliary protective shield in the form of a second extendable plate to further protect a bicycle rear derailleur with the direction of movement of the second plate indicated by an arrow.
Figure 13:
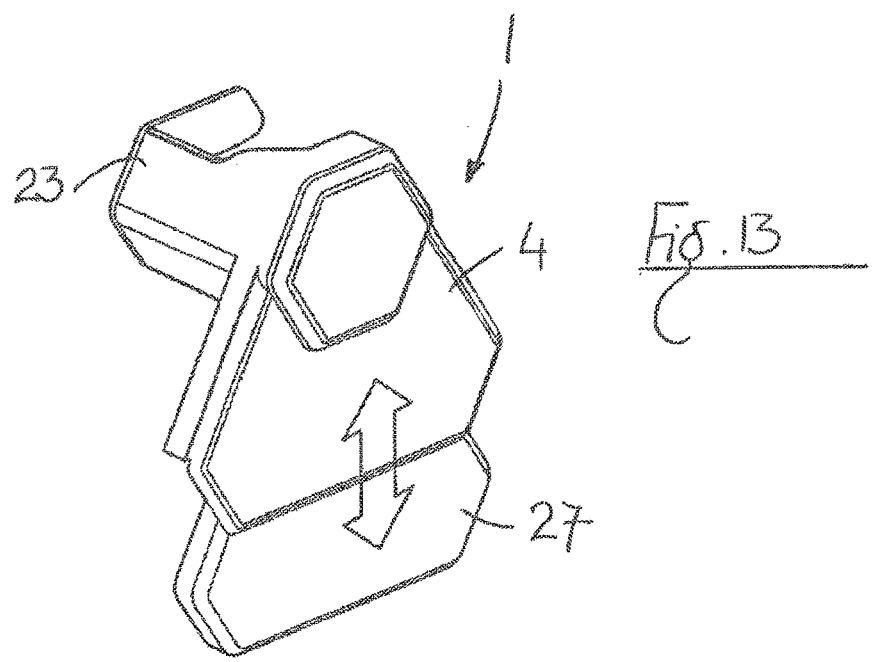
FIG. 13 is a perspective view from above and one side of a fourth embodiment of the rear derailleur protector of the invention similar to the rear derailleur protector of FIG. 6 further comprising a second plate operable between retracted and extended states as indicated by a double-headed arrow.
Figure 14:
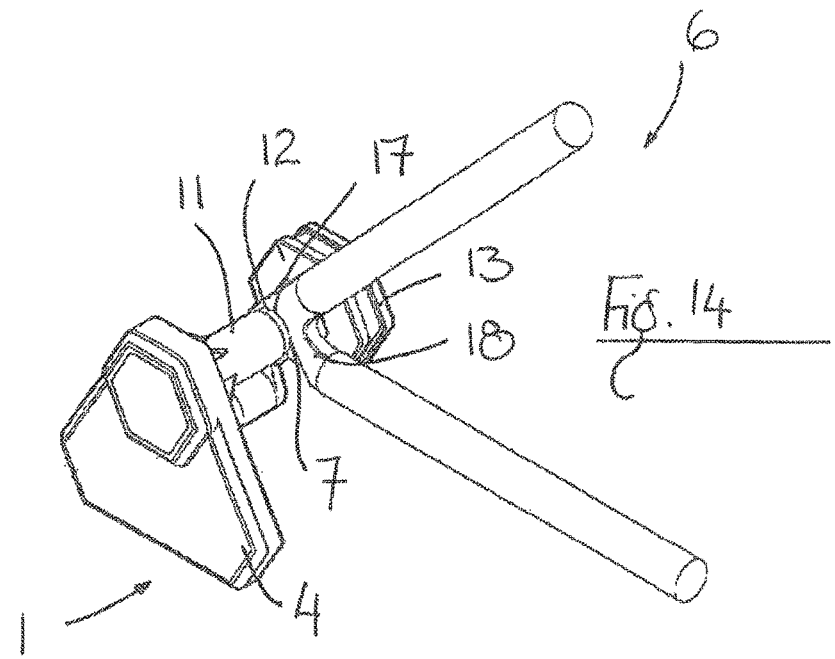
FIG. 14 is a perspective view from above and one side of the rear derailleur protector of FIG. 1 mounted in the rear dropout of the rear fork of a bicycle.
Figure 15:
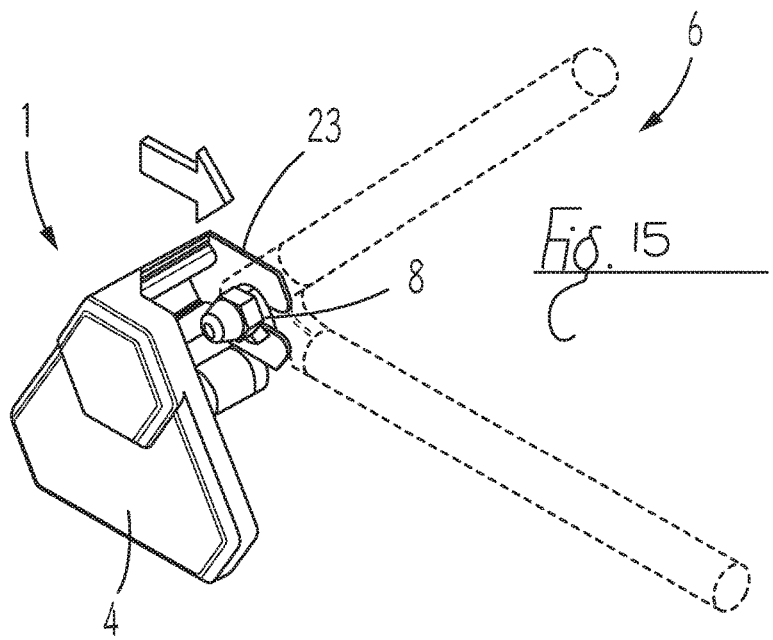
FIG. 15 is a perspective view from above and one side of the rear derailleur protector of FIG. 6 mounted to the rear axle at the rear fork of a bicycle.
Figure 16:
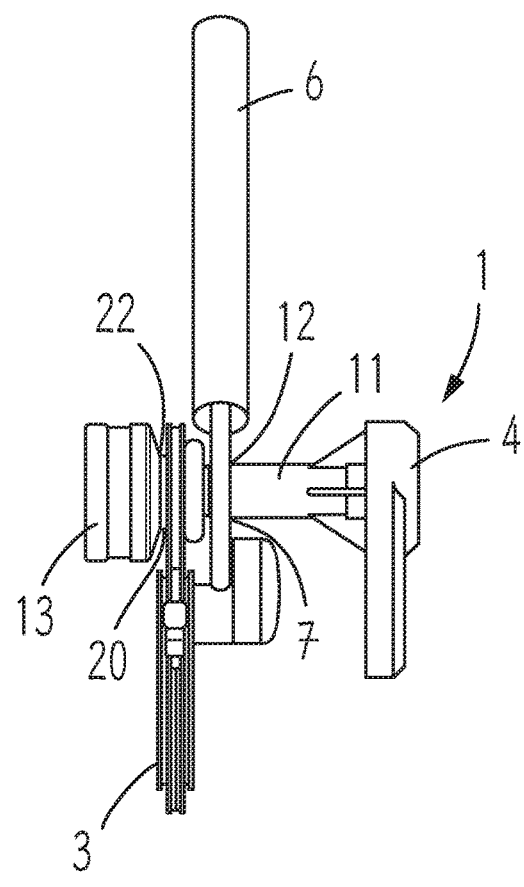
FIG. 16 is a rear plan view of a rear fork of a bicycle fitted with the rear derailleur protector of FIG. 1 with part of the drivechain of the bicycle housed in a channel-type holder provided in the handle of the rear derailleur protector.
Figure 17:
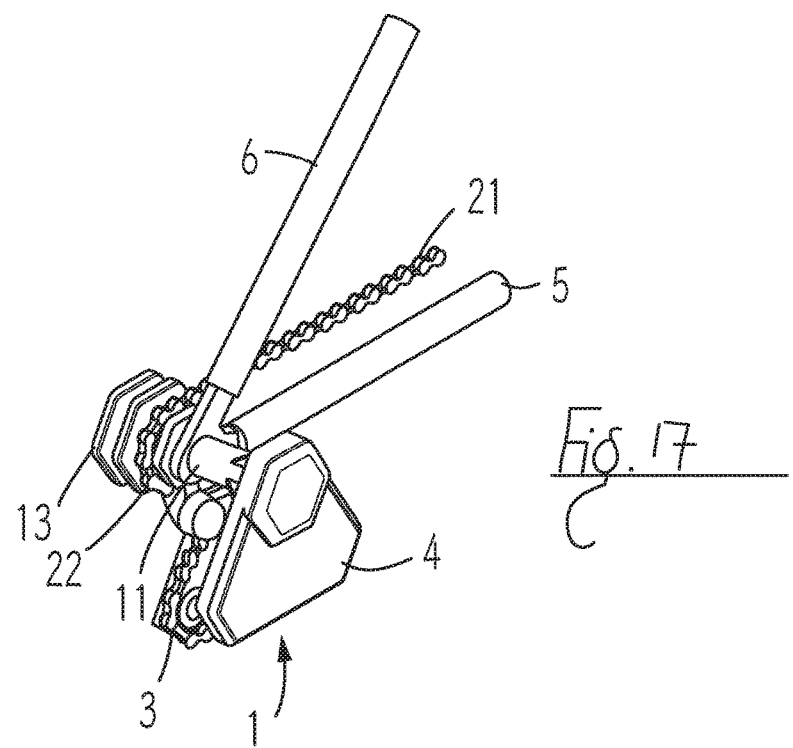
FIG. 17 is a perspective view from above and one side of the rear derailleur protector and rear fork of FIG. 16.
Figure 18:
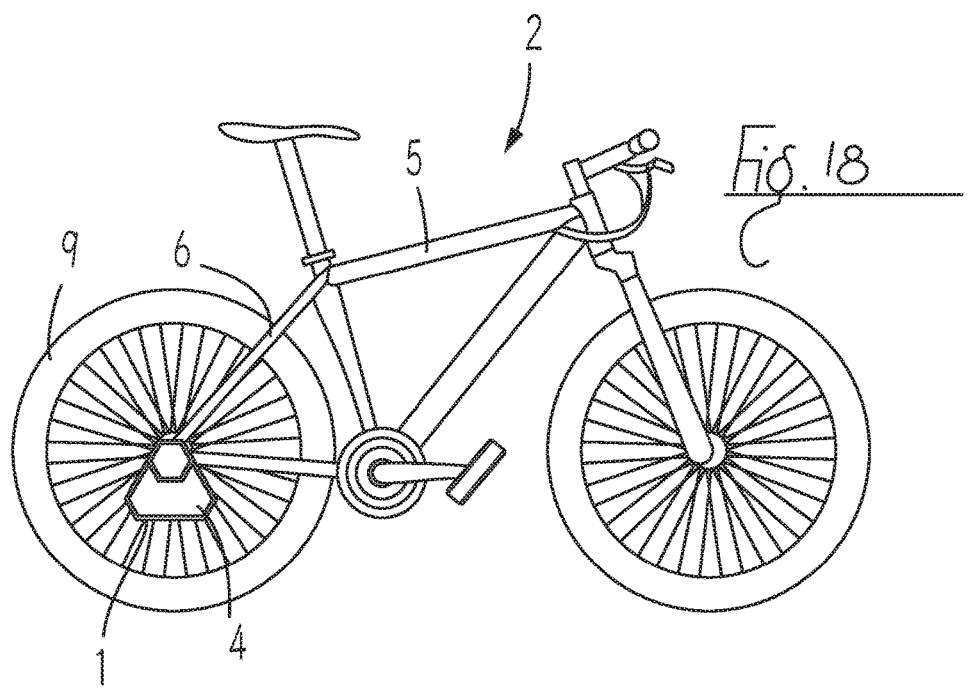
FIG. 18 is a side elevation of a bicycle having the rear derailleur protector mounted to the rear fork of the bicycle.

The rear derailleur protector 1 may further comprise an adjustable auxiliary protective shield in the form of a second plate 27 operable between a retracted state and an extended state as indicated by the arrows in FIGS. 12 and 13. The second plate 27 may be located adjacent the first plate 4 and may be in a side by side relationship with the first plate 4. The second plate 27 may be operated between the retracted state and the extended state by moving the second plate 27 relative to the first plate 4. The second plate 27 may be moved manually by a user. The second plate 27 is movable along the plane of the first plate 4 as depicted in FIGS. 12 and 13. The second plate 27 may be releasably connected to the first plate 4 by any suitable connecting means. Advantageously, the connecting means may provide an audible feedback when the second plate 27 is manipulated by a user from a retracted state to an extended state, and vice versa, to indicate that the second plate 27 is secured in the extended state or retracted state. The connecting means may additionally or alternatively provide a tactile feedback to indicate that the second plate 27 is secured in the extended state or retracted state. In use, the second plate 27 may be extended or retracted to increase or decrease the area of protection provided by the rear derailleur protector 1.

The first plate 4 and second plate 27 of the rear derailleur protector 1 may be formed of any suitable material, for example, a plastics material, optionally a hard plastics material. The handle 13 may be formed of the same or different plastics material as the first and second plates 4, 27 respectively. The tie bar 12 may be formed of any suitable material, such as metal, for example, an alloy such as steel. Similarly, the bifurcated coupling 23 and/or the stem 11 and/or threaded liner may be formed of the same or different material, optionally metal. Advantageously, the metal components of the rear derailleur protector 1 may be magnetic. The magnetic properties of these components may advantageously aid the assembly of the rear derailleur protector 1 by biasing the components together.

FIGS. 19 to 27 show a third embodiment of a rear derailleur protector 1 of the invention broadly similar to the rear derailleur protector 1 of FIG. 1. However, in the present embodiment, the rear derailleur protector 1 is adapted to simultaneously engage both dropouts 7 of the rear fork 6 of a bicycle 2 and is also fitted with an auxiliary protective shield in the form of a dependant slidable cage guard 34 to further protect the rear derailleur 3. The rear derailleur protector 1 of the present embodiment is also adapted for use with a stand to support bicycles 2 when the rear wheel 9 is removed. Like numerals indicate like parts.

As shown in the drawings, the rear derailleur protector 1 is provided with a rear derailleur protecting shield or plate 4 with stem 11, an oppositely disposed handle 13 also provided with a handle stem 28 similar to the plate stem 11 and an axial rod 29 mounted between the plate stem 11 and the handle stem 28. As shall be explained more fully below, the axial rod 29 functions as a substitute axle to support the rear fork 6 in use following removal of the rear wheel 9. More particularly, the axial rod 29 is provided with two spaced apart tie bars 12 spaced apart a distance on the axial rod 29 commensurate with the distance between the rear dropouts 7 of the rear fork 6 so that each tie bar 12 can engage with a rear dropout 7.

Between the tie bars 12, the axial rod 29 is provided with two spaced apart annular rings 30, 31 to define the channel 22 for receiving the drivechain 21.

The axial rod 29 is also fitted with a quick release mechanism 32 of the type usually found on bicycles 2 for tightening and releasing the engagement of the tie bars 12 with the rear dropouts 7 while a quick release lever 33 is provided on the plate 4 to effect opening and closing of the quick release mechanism 32.

The plate 4 is further provided with an adjustable downwardly depending L-shaped cage guard 34 to further assist in protecting the rear derailleur 3 from damage from below and the sides. The cage guard 34 is of particular utility for rear derailleurs 3 where the lower cogs of the rear derailleur 3 are in the lowermost positions (dependent on the gears engaged in the bicycle cogset). The cage guard 34 is attached to the interior face of the plate 4 at a cage guard adjustment mechanism 35 controllable via a manually adjustable dial 36 on the external face of the plate 4 to raise and lower the cage guard 34 as required.

As indicated above, the cage guard 34 is L-shaped so that the base of the L-shaped guard 34 extends inwards beneath the rear derailleur 3 in use towards the handle 13. At its free end, the cage guard 34 is further provided with an upwardly disposed edge to further protect the rear derailleur 3 from damage from the handle side 13 of the rear derailleur protector 1.

In use, the rear derailleur protector 1 of the present embodiment is employed on a bicycle 2 from which the rear wheel 9 has been removed. More particularly, the rear wheel 9 is first removed using the rear wheel quick release mechanism. With the quick release mechanism 32 of the rear derailleur protector 1 moved to the open position using the quick release lever 33 on the plate 4, the rear derailleur protector 1 is then positioned at the rear dropouts 7 so that the two tie bars 12 on the axial rod 29 are located at the dropout slots 17 and the drivechain channel 22 is positioned beneath the drivechain 21. The tie bars 12 are then simply slid into the dropout slots 17 so that the dropouts 7 of the rear fork 6 are held and supported apart on the axial rod 29 while the rear derailleur 3 is protected by the plate 4 and the cage guard 34. As will be appreciated by those skilled in the art, the rear derailleur protector 1 therefore serves to maintain the dropouts 7 in the correct position for receiving the rear wheel 9 whilst also protecting the dropouts 7 from damage.

As indicated above, the rear derailleur protector 1 is adapted for use with a stand 38 as shown in FIGS. 25 to 31 to protect the rear derailleur 3 and simultaneously support a bicycle 2 in the upright position following removal of the rear wheel 9 of the bicycle 2. As shall be explained more fully below, the rear derailleur protector 1 is provided with a stand mounting in the form of a recessed groove 39 on the axial rod 29 adjacent the chain receiving channel 22. The groove 39 is defined by the annular ring 30 defining the chain receiving channel 22 together with an additional annular ring 40 provided on the axial rod 29 towards the handle 13.

As shown in the drawings, the stand 38 is generally A-shaped and is made up of a major leg 41 and a dog-leg shaped minor leg 42 attached to the major leg 41 at a dual function clamp cum hinge 43 so that the stand 38 is moveable about the hinge 43 between a standing position to support and clamp the rear derailleur protector 1 (and a bicycle 2 to which the rear derailleur protector 1 is attached) and a collapsed or folded position as shown particularly in FIG. 28.

The major leg 41 is made up of an elongate two-part channel-shaped housing 44 formed from a first wall 50 and a second wall 51 attached to the first wall 50 and defining a channel 52 therebetween. The channel 52 is shaped and dimensioned to receive the minor leg 42 in the folded position while both the major leg 41 and the minor leg 42 are both provided with feet 45 at their free ends remote from the hinge 43.

As indicated above, the major leg 41 and the minor leg 42 together define a clamp-like rear derailleur protector mounting at the hinge 43. The rear derailleur mounting 47 is made up of a seat in the form of an indented notch 46 in the major leg 41 at the hinge 43 for receiving the rear derailleur protector 1 at the recessed groove 39 on the axial rod 29. The indented notch 46 is sized and dimensioned to sit into the recessed groove 39 to prevent lateral movement of the rear derailleur protector 1 in the indented notch 46.

Moreover, the rear derailleur protector mounting is further made up of the dog-leg end 49 of the minor leg 42 which is located towards the hinge 43 but oriented away from the hinge 43. More particularly, as shown in FIGS. 28 and 29, a face 53 of the dog-leg end 49 is oriented towards the indented notch 46 and is provided with a recessed bearing to hold the axial rod 29 of the rear derailleur protector 1 in place in the seat defined by the indented notch 46 i.e. movement of the minor leg 42 about the clamp cum hinge 43 causes the dog-leg end 49 to move into and out of the indented notch 46 to open and close the indented notch 46.

Figure 31:
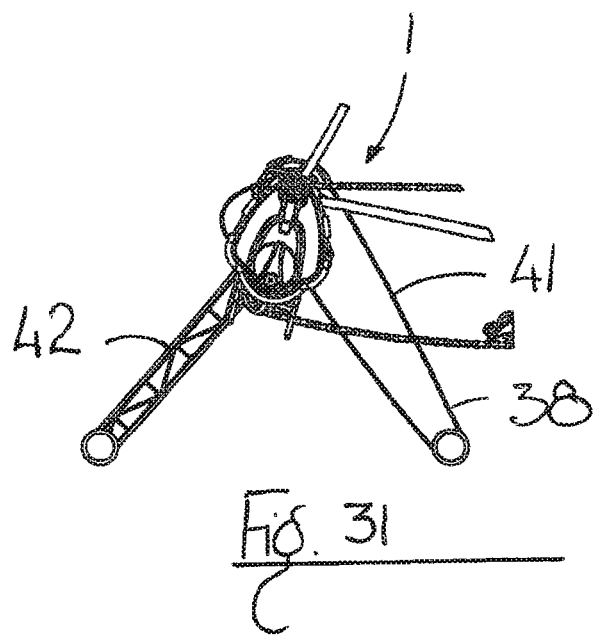
FIG. 31 is an enlarged side elevation of the rear derailleur protector mounted in the foldable stand of FIG. 30.
Figure 30:
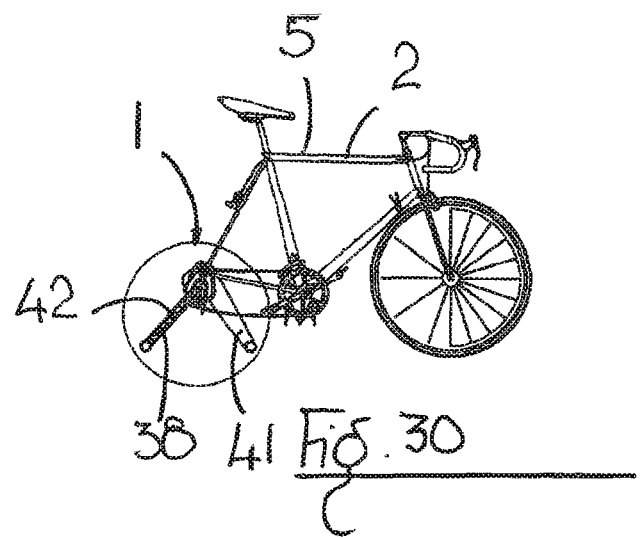
FIG. 30 is a side elevation of a bicycle with the rear wheel removed and fitted with the rear derailleur protector and stand of FIG. 28.

Accordingly, in use, the rear derailleur protector 1 of the invention is first attached to the fork 6 of a bicycle 2 as previously described and the stand 38 is placed in an upright open position as shown in FIG. 28 by adjusting the major and minor legs 41, 42 so that the seat for receiving the rear derailleur protector 1 defined by the indented notch 46 is open i.e. dog-leg end 49 of the minor leg 42 is not fully inserted in the indented notch 46. The fork 6 of the bicycle 2 fitted with the rear derailleur protector 1 is then positioned over the stand 38 and the axial rod 29 of the rear derailleur protector 1 is guided into the open indented notch 46. The downward force exerted by the bicycle 2 on the stand 38 then causes the major leg 39 and the minor leg 40 to move apart at the feet 45 so that the major and minor legs 41, 42 pivot at the clamp cum hinge 43 with the result that the dog leg end 49 of the minor leg 42 bears down on the axial rod 29 of the rear derailleur protector 1 at the recessed bearing to clamp the rear derailleur protector 1 in place in the rear derailleur protector mounting. The rear derailleur protector 1 is therefore prevented from exiting the indented notch 46 by the dog-leg end 49 of the minor leg 4. The indented notch 46 is sized and dimensioned to sit into the recessed groove 39 to prevent lateral movement of the rear derailleur protector 1 in the indented notch 46. As shown in FIGS. 30 to 31, a bicycle 2 with the rear wheel 9 removed can therefore be securely supported by the rear derailleur protector 1 and stand 38.

The invention claimed is:

1. A temporary rear derailleur protector for a bicycle having a derailleur, a rear fork, and a rear axle, the protector comprising:
   a shield to adapted to protect the derailleur from the sides and below, and
   a mount coupled to the shield, the mount adapted for mounting the shield to only a single point on the rear axle of the bicycle, the mount comprising a bifurcated coupling slidably engageable with and removable from the rear axle at a gap adjacent the rear wheel derailleur between the rear fork and the axle.

2. A rear derailleur protector as claimed in claim 1 wherein the shield is detachable from the rear derailleur protector.

3. A rear derailleur protector as claimed in claim 1 wherein the shield comprises a plate.

4. A rear derailleur protector as claimed in claim 3 wherein the plate comprises an auxiliary protective shield to further protect the derailleur.

5. A rear derailleur protector as claimed in claim 4 wherein the auxiliary protective shield comprises a second plate located adjacent the plate operable between a retracted state and an extended state.

6. A rear derailleur protector as claimed in claim 5 wherein the auxiliary protective shield provides at least one of tactile and audible feedback when moved between the retracted state and the extended state.

7. A rear derailleur protector as claimed in claim 3 wherein the bifurcated coupling is substantially L-shaped.

8. A rear derailleur protector as claimed in claim 7 wherein the L-shaped bifurcated coupling comprises first and second arms and the first arm is connected to the plate and the second arm comprises the bifurcated coupling.

9. A rear derailleur protector as claimed in claim 7 wherein the first and second arms are perpendicular to each other.

10. A rear derailleur protector as claimed in claim 3 wherein the plate is vertically alignable with the derailleur.

11. A rear derailleur protector as claimed in claim 1 wherein the mount is adapted to swivel about the rear axle.

12. A rear derailleur protector as claimed in claim 1 wherein the mount comprises a first arm adapted to be coupled to a first end of the shield, and wherein a second end of the first arm is coupled to the bifurcated coupling and extending substantially perpendicular therefrom.

13. A rear derailleur protector as claimed in claim 12 wherein the first arm defines a predetermined distance for spacing the shield from the derailleur.

14. A rear derailleur protector as claimed in claim 1 wherein the shield is adapted to occlude the rear derailleur of the bicycle.

* * * * *